United States Patent Office 3,249,455
Patented May 3, 1966

3,249,455
DISPERSING ORGANIC PIGMENTS IN AN ORGANIC MEDIUM
Charles R. Williams, Longmeadow, Mass., assignor to Monsanto Company, St. Louis, Mo., a corporation of Delaware
No Drawing. Filed June 4, 1964, Ser. No. 372,698
4 Claims. (Cl. 106—309)

This application is a continuation-in-part of copending application Serial No. 227,935, filed October 2, 1962, and now abandoned.

This invention relates to an improved method of dispersing organic pigments in liquid organic systems.

The dispersing of organic pigments in a liquid organic medium has always presented the problem of obtaining an effective and a stable dispersion of the organic pigment. This problem exists because of the complex structure of organic pigments and because of their generally high molecular weights. A satisfactory dispersion of these pigments is necessary in order to prevent settling and caking of the pigment, particularly while the dispersion is being stored or shipped. Further, effective and stable dispersions of organic pigments is of particular importance when coating compositions are employed in the recently popular household pressure-type spray containers. In some of these coating compositions, complex organic pigments are dispersed in the organic medium. Settling or caking of such a pigment would be extremely detrimental to the proper operation of these spray containers.

Therefore, the obtaining of an effective and a stable dispersion of an organic pigment in an organic medium by employing an organic dispersing agent therein is of extreme importance to the industry.

Thus, it is an object of this invention to provide an improved process for preparing liquid organic dispersions of organic pigments by employing certain organic polymers therein as a dispersing agent.

Briefly, according to this invention, the foregoing and other objects are attained by incorporating in an organic medium a tertiary alkyl ammonium salt of a substituted amide of an olefin-maleic anhydride copolymer, which is an effective dispersant for organic pigments.

The following examples are set forth to illustrate more clearly this invention and are not intended to limit the scope thereof. Unless otherwise indicated, all parts are parts by weight.

Example I

Dissolve separately in acetone stoichiometrically equivalent portions of benzyl amine and an ethylene-maleic anhydride copolymer having a molecular weight of about 1500 (as determined by the specific viscosity of a 1% solution of the ethylene-maleic anhydride copolymer in dimethyl formamide). Mix together, under agitation, the two solutions and reflux at about 56° C. for 3 hours. Recover the precipitate formed therefrom by vacuum filtration. Dissolve 6.1 parts of the recovered precipitate in 90 parts of xylene, which contains therein 3.9 parts of tri(n-propyl) amine so as to form a 10% solids solution containing the tri(n-propyl) ammonium salt of the half benzyl amide of the ethylene-maleic anhydride copolymer.

Two dispersion samples are prepared, one containing 25 parts of the above solution and 10 parts of phthalocyanine blue (Monastral Blue), and the other containing again 25 parts of the above solution and 10 parts of toluidine red (CP Toner A-2990). Both are satisfactory dispersions of the organic pigment in the organic medium. There is a little or no settling of the organic pigment employed therein.

This invention is directed to an improved process of preparing a dispersion of an organic pigment in an organic solvent by employing therein as a dispersing agent a tertiary alkyl ammonium salt of a substituted amide of an olefin-maleic anhydride copolymer. The quantity of the tertiary alkyl ammonium salt of said substituted amide necessary to produce an effective dispersion is 0.1–7.0 weight percent based on the weight of the organic pigment employed. The said salt of the said substituted amide of an olefin-maleic anhydride copolymer has in its structure recurring groups of the formulae:

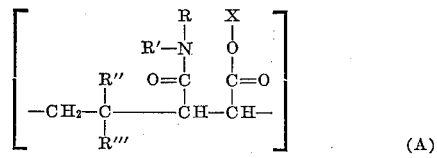

(A)

and

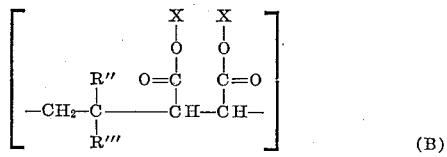

(B)

with the groups of Formula A constituting 50–100% and preferably 80–100% of the total of groups (A) and (B) wherein R is selected from the group consisting of alkyl, aryl, alkaryl, aralkyl and cycloalkyl radicals; R' is selected from the group consisting of hydrogen, alkyl, aryl, alkaryl, aralkyl and cycloalkyl radicals; R'' is selected from the group consisting of hydrogen, methyl and ethyl radicals and R''' is selected from the group consisting of hydrogen and methyl, providing that when R'' is ethyl, R''' is hydrogen. In the above composition the alkyl radicals have 3–18 carbon atoms, the aryl radicals have 1–3 aromatic rings, the alkyaryl and aralkyl radicals have an alphatic moiety of 1–10 carbon atoms and an aromatic moiety of 1–2 rings associated therewith and the cycloalkyl radicals have 5–7 carbon atoms. In the above composition, X is a positive charge ion formed from tertiary alkyl amines. The pH of a solution of the salt of the said substituted amide should be in the range of 4–11 and preferably in the range of 7–10. In the practice of this invention, the preferred salt of the substituted amide of an olefin-maleic anhydride copolymer is the tri(n-propyl) ammonium salt of the cyclohexyl amide of an ethylene-maleic anhydride copolymer.

In the practice of this invention, the molecular weight of the tertiary alkyl ammonium salt of the substituted amide of an olefin-maleic anhydride copolymer is significant as to its use as a dispersant for organic pigments in a liquid organic medium. The copolymer employed in this invention to prepare the salt thereof should have a weight average molecular weight of up to about 10,000 and preferably 800–4000 and more particularly 1000–2500. In the preferred embodiment of this invention wherein the salt of the copolymer is the tri(n-propyl) ammonium salt of the cyclohexyl amide of an ethylene-maleic anhydride copolymer, the recurring groups of Formulae A and B total 3–20 for the preferred weight average molecular weight of about 800–4000 for the copolymer portion of the groups of the Formulae A and B. Depending upon the structure of Formulae A and B and in particular where the salt of the copolymer consists of 100% of Formula A, the number of recurring groups thereof can total up to about 50 in order to achieve a weight average molecular weight of 10,000 for the copolymer portion of the group of Formula A. If the weight average molecular weight of the olefin-maleic anhydride copolymer portion of the group as set forth in Formulae A and B is in excess of 10,000, the dispersing effect of the salt of the copolymer is no longer practicable and probably serves little use in dispersing organic pigments in a liquid organic medium. Optimum dispersing action is generally achieved with the copolymer portion having a weight average molecular weight of 1000–2500.

The dispersing agent employed in the practice of this invention; namely, the tertiary alkyl ammonium salt of a substituted amide of an olefin-maleic anhydride copolymer is soluble in such organic media as mineral spirits, methyl ethyl ketone, toluol, xylol, etc., and mixtures thereof and as such is an excellent dispersing agent for organic pigments in said organic media. The preferred organic media employed herein is xylol. The tertiary alkyl amines suitable for producing the corresponding salts of the said substituted amides have in each aliphatic alkyl moiety 2–6 carbon atoms and preferably 3–5 carbon atoms. Typical amines of this class, which may be employed in the practice of this embodiment, are triethyl amine, tri-isopropyl amine, tri(n-propyl) amine, tri-butyl amine, and tri-isobutyl amine and mixtures thereof.

Broadly, the process for preparing the substituted amide of an olefin-maleic anhydride copolymer employed in the practice of this invention comprises dissolving an olefin-maleic anhydride copolymer and up to a stoichiometrically equivalent portion of a substituted amine in an inert liquid organic solvent. The solution is maintained at a temperature between about 20° C. and about 150° C. for a period from about 2 minutes to 3 hours. As used herein, "inert organic solvent" means any organic solvent that is not reactive with a carboxylic anhydride or an amine and includes solvents selected from the class consisting of ketones, aromatics and esters.

The preferred process for preparing the copolymers employed in the practice of this invention comprises (a) dissolving separately in an inert liquid organic solvent an olefin-maleic anhydride copolymer and up to a stoichiometrically equivalent portion of a substituted amine, (b) mixing the two solutions together in order to react the olefin-maleic anhydride and the substituted amine, and (c) refluxing for a period of about 2 to 3 hours. Refluxing is used to obtain a high product yield, generally above 90%. The product thus obtained is the acid form of the substituted amide of an olefin-maleic anhydride copolymer.

The olefin-maleic anhydride copolymers employed herein may be either an ethylene-maleic anhydride, a propylene-maleic anhydride, a butylene-maleic anhydride, or an isobutylene-maleic anhydride copolymer. The basic structure of these copolymers have recurring groups of the formula:

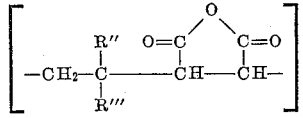

wherein R″ is selected from the group consisting of hydrogen, methyl and ethyl radicals, and R‴ is selected from the group consisting of hydrogen and methyl radicals. However, where R″ of the above formula is ethyl, then of necessity R‴ must be hydrogen in order to fulfill the requirements of a normal butylene-maleic anhydride copolymer. The preferred olefin-maleic anhydride copolymer is an ethylene-maleic anhydride copolymer wherein R″ and R‴ in the formula are hydrogen and the number of recurring groups of the formula are 3–20.

The substituted amine employed herein and reacted with the olefin-maleic anhydride copolymer is represented by the formula:

wherein R is selected from the group consisting of alkyl, aryl, alkaryl, aralkyl and cycloalkyl radicals, and R′ is selected from the group consisting of hydrogen, alkyl, aryl, alkaryl, aralkyl and cycloalkyl radicals. The alkyl radicals of the above formula have 3–18 carbon atoms. The aryl radicals have 1–3 aromatic rings. The alkaryl and aralkyl radicals have an aliphatic moiety of 1–10 carbon atoms and an aromatic moiety of 1–2 rings associated therewith. The cycloalkyl radicals have 5–7 carbon atoms.

Typical examples of the substituted amine compounds which may be employed herein are butyl amine, octyl amine, octadecyl amine, aniline, alpha-naphthyl amine, anthramine, benzyl amine, xylyl amine (tolubenzyl amine), toluidine, p-(n-butyl) aniline, p-nonyl phenyl amine, cyclohexyl amine, cyclopentyl amine, diethyl amine, dibutyl amine, dioctyl amine, dibenzyl amine, dicyclohexyl amine, methyl ethyl amine, methyl n-propyl amine, methyl octyl amine, methyl benzyl amine, methyl cyclopentyl amine and mixtures thereof. The preferred substituted amine is cyclohexyl amine wherein R is a cyclohexyl radical and R′ is hydrogen.

The advantages of this invention are found in the ability of the tertiary alkyl ammonium salt of the substituted amide of an olefin-maleic anhydride copolymer to disperse organic pigments in an organic medium so as to provide stable dispersions of the organic pigments even while storing or shipping. Typical examples of the organic pigments which are readily dispersed in the practice of this invention are the phthalocyanine blues, phthalocyanine greens, toluidine reds, Hansa yellow, B.O.N. reds, litho reds, and pera reds. A few specific applications include textile print paste systems such as straight oil, printing inks, predispersed organic pigment sytsems, surface coating compositions, dispersions of organic pigments in organic aerosol formulations such as an acrylate resin in a solvent solution, dispersions of insecticides, fungicides and dispersions of rubber chemicals for purpose of satisfactory compounding.

It will thus be seen that the objects set forth above, among those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

What is claimed is:

1. In a process for preparing dispersions of insoluble organic pigments in a medium consisting of liquid organic medium; the improvement which comprises incorporating in the liquid organic medium a tertiary alkyl ammonium salt of a substituted amide of an olefin-maleic anhydride copolymer in the amount of 0.1–7.0 weight percent based on the weight of the organic pigment dispersed therein; said tertiary alkyl ammonium salt of the substituted amide of an olefin-maleic anhydride copolymer having a weight average molecular weight of up to about 10,000 and having in its structure recurring groups of the formulae:

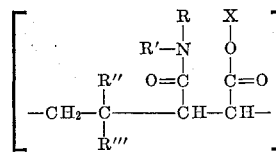

(A)

and

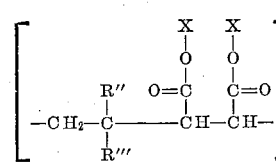

(B)

with the groups of Formula A constituting 50–100% of the total of groups (A) and (B); wherein R is selected from the group consisting of alkyl, aryl, alkaryl, aralkyl and cycloalkyl radicals; R' is selected from the group consisting of hydrogen, alkyl, aryl, alkaryl, aralkyl and cycloalkyl radicals; R'' is selected from the group consisting of hydrogen, methyl and ethyl radicals; R''' is selected from the group consisting of hydrogen and methyl, providing that when R'' is ethyl, R''' is hydrogen; said alkyl radicals having 3–18 carbon atoms; said aryl radicals having 1–3 aromatic rings; said alkaryl and aralkyl radicals having an aliphatic moiety of 1–10 carbon atoms and an aromatic moiety of 1–2 rings associated therewith; said cycloalkyl radicals having 5–7 carbon atoms; and X is an ion formed from a tertiary alkyl amine, wherein each aliphatic alkyl moiety thereof have 2–6 carbon atoms.

2. A process as described in claim 1 wherein the number of groups of Formulae A and B total 3–20.

3. A process as described in claim 1 wherein the tertiary alkyl ammonium salt of a substituted amine of an olefin-maleic anhydride copolymer is the tertiary alkyl ammonium salt of a substituted amide of an ethylene-maleic anhydride copolymer.

4. A process as described in claim 1 wherein the tertiary alkyl ammonium salt of a substituted amide of an olefin-maleic anhydride copolymer is the tri(n-propyl) ammonium salt of a cyclohexyl amide of an ethylene-maleic anhydride copolymer.

References Cited by the Examiner
UNITED STATES PATENTS

| | | | |
|---|---|---|---|
| 2,913,437 | 11/1959 | Johnson | 106—308 |
| 2,977,334 | 3/1961 | Zopf et al. | 260—78.5 |
| 3,000,840 | 9/1961 | Johnson et al. | 260—29.6 |
| 3,037,875 | 6/1962 | Geiser | 106—308 |
| 3,088,837 | 5/1963 | Prescott et al. | 106—308 |

TOBIAS E. LEVOW, *Primary Examiner.*